United States Patent [19]

Specktor

[11] 4,246,686
[45] Jan. 27, 1981

[54] METHOD FOR FORMING AN ATTACHING, ROTATIONAL, SELF-ALIGNMENT APPARATUS

[76] Inventor: Gerald A. Specktor, 409 Cleveland Ave. South, St. Paul, Minn. 55105

[21] Appl. No.: 869

[22] Filed: Jan. 4, 1979

Related U.S. Application Data

[60] Division of Ser. No. 722,825, Sep. 13, 1976, Pat. No. 4,138,877, which is a continuation of Ser. No. 550,378, Feb. 18, 1975, abandoned.

[51] Int. Cl.³ .................... B23P 17/00; B23P 13/04
[52] U.S. Cl. .................................. 29/416; 29/557
[58] Field of Search ................ 105/464, 465, 485; 29/416, 557; 72/705; 228/170; 403/18, 252, 326, 347; 24/201 A; 248/119 R

[56] References Cited

U.S. PATENT DOCUMENTS

| | | | |
|---|---|---|---|
| 2,363,436 | 11/1944 | Pancoe | 403/252 |
| 2,836,444 | 5/1958 | Arnold | 403/18 |
| 2,957,226 | 10/1960 | Dibner | 29/557 X |
| 3,009,719 | 11/1961 | Otto et al. | 403/252 |
| 3,252,681 | 5/1966 | Watts | 105/485 |
| 3,306,234 | 2/1967 | Hansen et al. | 105/465 |
| 3,949,458 | 4/1976 | Saidel | 29/416 |
| 3,952,396 | 4/1976 | Werner | 29/416 |
| 3,979,809 | 9/1976 | Schneider | 29/416 |

Primary Examiner—Lowell A. Larson
Attorney, Agent, or Firm—Wicks & Nemer

[57] ABSTRACT

A method is disclosed for forming an apparatus, where the apparatus is arranged for rotation about a vertical axis, for attaching accessories to a support surface of a repairing and straightening apparatus, for allowing rotational self-alignment of the accessories about the vertical axis, and for allowing the accessories to be substantially in line with the counterforce. The method, in its preferred form, is accomplished by cutting and attaching a thick wall tubing. The thick wall tubing has a diameter substantially equal to but slightly less than the diameter of apertures formed in the support surface and has a height greater than the thickness of the support surface. A first saw cut is made at a depth substantially equal to but slightly greater than the thickness of the support surface and along a chord of the circular cross section of the thick wall tubing. A second saw cut is made, spaced and parallel to the first saw cut and at a depth equal to the depth of the first saw cut. A third saw cut is made intersecting with the first and second saw cuts at a depth substantially equal to but slightly greater than the thickness of the support surface. After removing the material located between the first and second saw cuts, the remaining portions of the thick wall tubing are attached together and the thick wall tubing is attached to the bottom surface of the accessory.

7 Claims, 6 Drawing Figures

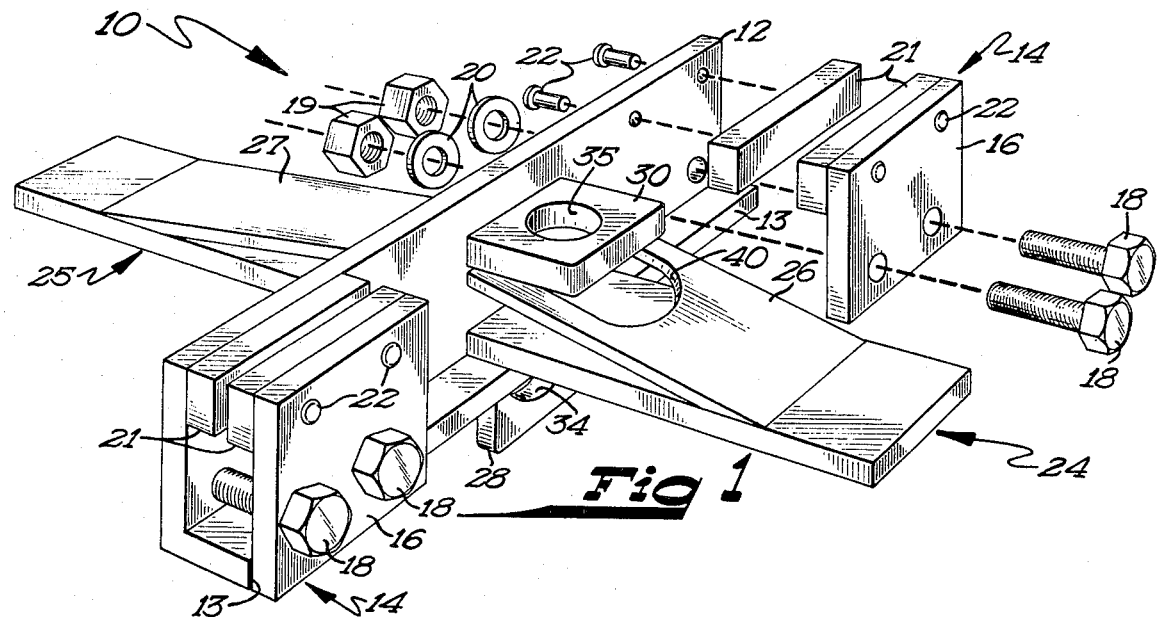
Fig 1
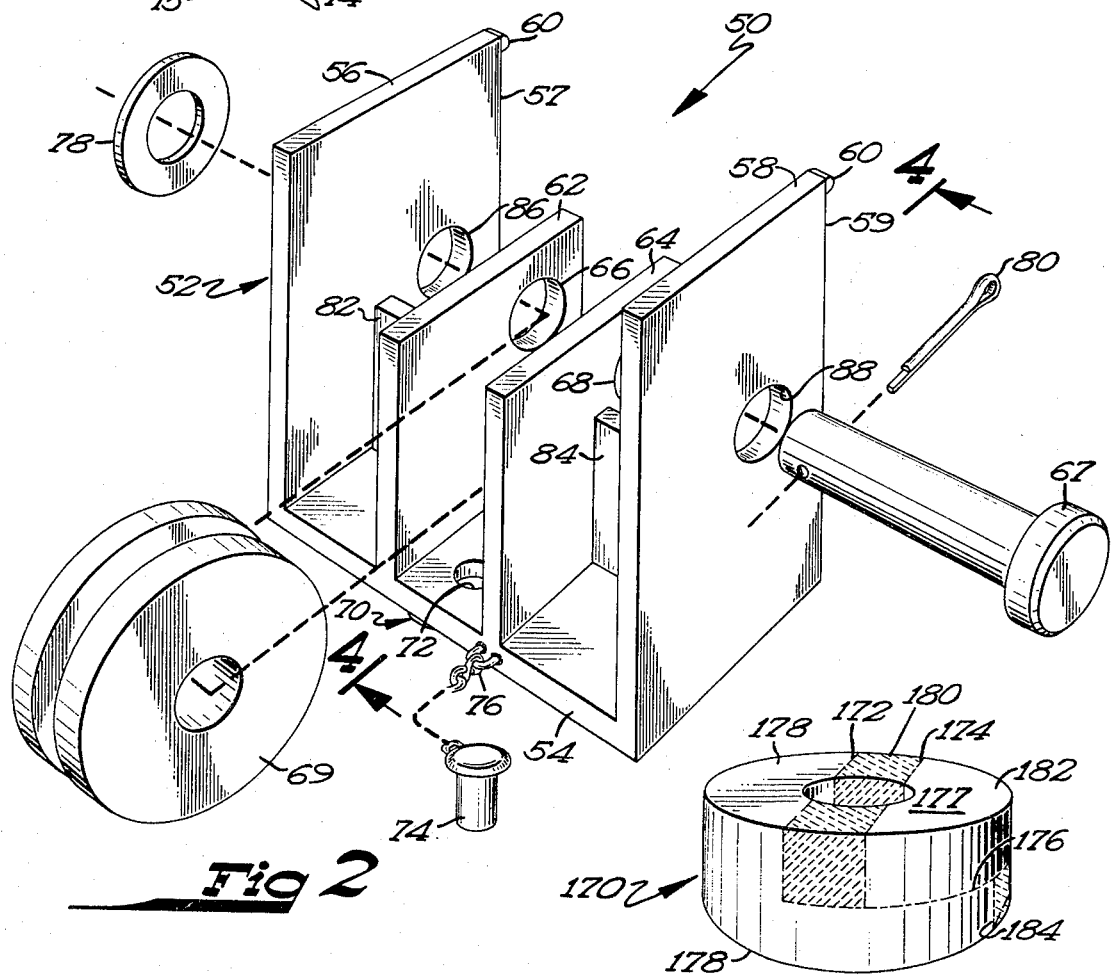
Fig 2
Fig 10

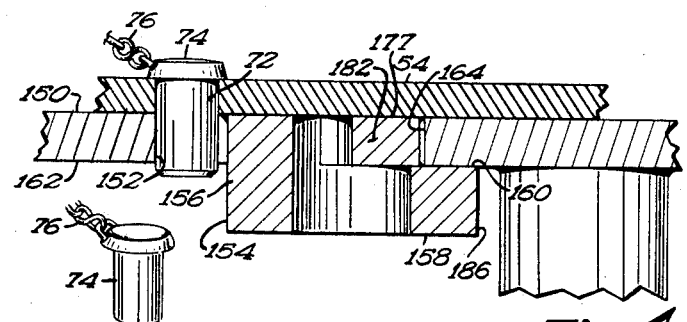
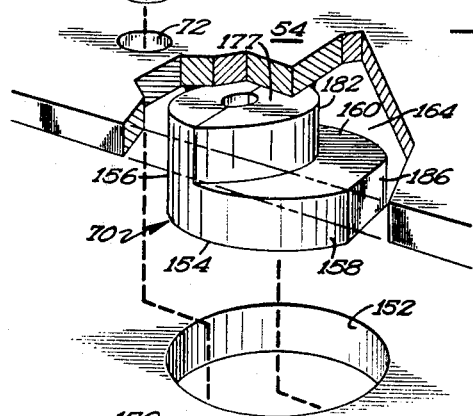
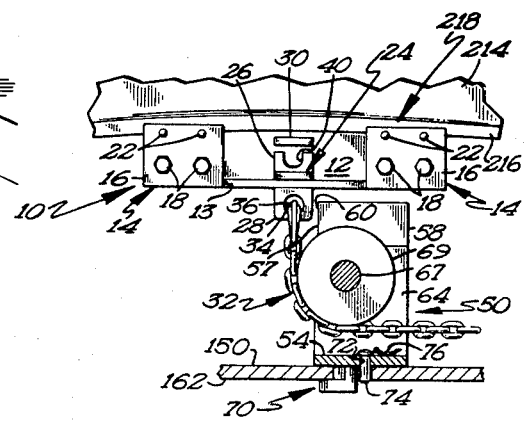

METHOD FOR FORMING AN ATTACHING, ROTATIONAL, SELF-ALIGNMENT APPARATUS

CROSS REFERENCE

This is a division of Application Ser. No. 722,825 filed Sept. 13, 1976, by the same inventor, now U.S. Pat. No. 4,138,877, which in turn is a continuation of application Ser. No. 550,378 filed Feb. 18, 1975, by the same inventor, now abandoned.

BACKGROUND

The present invention relates to a method for forming an attaching, rotational, self-alignment apparatus. With the increasing sophistication of apparatus for repairing and straightening, faster repairing and straightening of damaged vehicles has been attained without large expenditures of time, labor, and energy. There is also an increasing need for accessories for use in such apparatus for repairing and straightening to further increase their ability to repair vehicles having various types of damage and to further increase their efficiency to thus further reduce the time, labor, and effort required to so repair and straighten.

A special need has arisen for accessories for use in repairing unibody type vehicles. Previous apparatus used in anchoring unibody type vehicles has serious deficiencies in the ability to accept the counterforce conveyed from the vehicles substantially in line with the counterforce. Therefore, it was necessary to align the vehicle exactly in a position allowing the counterforce to be conveyed substantially in line. Thus, it was necessary to move the vehicle to an exact position, possibly severaly times, thus requiring large expenditures of time and effort.

Thus, a need has arisen for a method of manufacture of an attaching, rotational, self-alignment apparatus for such accessories and which facilitates assembly, is considerably less expensive in manufacture, and insures a better reinforced article.

SUMMARY

The present invention solves these and other problems in forming an attaching, rotational, self-alignment, apparatus by providing, in the preferred embodiment, a thick wall tubing of suitable diameter and height. First, second, and third cuts are made in the thick wall tubing at the appropriate depths and angles such that the material located between the first and second cuts can be removed and the remaining portions of the thick wall tubing attached together. The thick wall tubing can then be attached to the bottom surface of the accessory.

It is a primary object of the present invention to provide a novel method for forming an attaching, rotational, self-alignment apparatus.

It is further an object of the present invention to provide such a method for forming apparatus, for rotation about a vertical axis, for attaching accessories to a support surface of a repairing and straightening apparatus, for allowing rotational self-alignment of the accessories about the vertical axis, and for allowing the accessories to be substantially in line with the counterforce.

It is further an object of the present invention to provide such a method which facilitates assembly.

It is further an object of the present invention to provide such method which is considerably less expensive in manufacture.

It is further an object of the present invention to provide such a method which insures a better reinforced article than known in the prior art.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 is an exploded prospective view of a clamp member for use with an accessory using the teachings of the present invention.

FIG. 2 is an exploded prospective view of the accessory which can be utilized with the apparatus of FIG. 1.

FIG. 4 is a cross sectional view of the apparatus of FIG. 2 according to Section line 4—4 of FIG. 2.

FIG. 5 is an exploded perspective view of the apparatus of FIG. 4 with portions of the apparatus broken away.

FIG. 9 is a side view of the apparatus of FIGS. 1 and 2 in use according to the teachings of the present invention.

FIG. 10 is a prospective view showing the method of manufacture of the attaching, rotational, self-alignment apparatus utilizing the teachings of the present invention.

The remaining figures of the drawings of the present invention and the remaining disclosure of the present invention, including preferred embodiments, are incorporated herein by reference to application Ser. No. 722,825 filed Sept. 13, 1976, by Gerald A. Specktor entitled "Accessories for An Apparatus For Repairing and Straightening", now U.S. Pat. No. 4,138,877, the parent application of the present application.

I claim:

1. Method for forming apparatus, for rotation about a vertical axis, for attaching accessories to a support surface of a repairing and straightening apparatus, for allowing rotational self-alignment of the accessories about the vertical axis, and for allowing the accessories to be substantially in line with the counterforce, with the support surface being of a finite thickness and including at least one regularly shaped aperture passing vertically through the support surface, comprising the steps of:
  (a) providing a thick wall tubing having a top, having a diameter substantially equal to but slightly less than the diameter of the support surface aperture, and having a height greater than the thickness of the support surface;
  (b) first cutting the thick wall tubing along a chord of the circular cross section of the thick wall tubing extending into the thick wall tubing from the top to a depth from the top of the thick wall tubing substantially equal to but slightly greater than the thickness of the support surface;
  (c) second cutting the thick wall tubing spaced from and parallel to the first cut and extending into the thick wall tubing from the top to a depth equal to the depth of the first cut;
  (d) third cutting the thick wall tubing intersecting with the first and second cuts at a depth from the top of the thick wall tubing substantially equal to but slightly greater than the thickness of the support surface;

(e) removing the material located between the first and second cuts;

(f) attaching together the remaining portions of the thick wall tubing into face to face contact along the first and second cuts; and (g) attaching the top of the thick wall tubing to the bottom surface of the accessory.

2. The method of claim 1 wherein the method further comprises the step of fourth cutting along a chord of the circular cross section of the thick wall tubing spaced from the first and second cuts and extending through the thick wall tubing from the third cut away from the top for forming a flat end portion for transferring the counterforce from the accessory to the bottom surface of the support surface along a line and for reducing the shearing effect of the apparatus on the support surface.

3. The method of claim 1 or 2 comprising the step of cutting the second cut to a length equal to the length of the first cut.

4. The method of claim 3 wherein the method further comprises the step of forming an aperture in the bottom surface of the accessory directly in front of the thick wall tubing opposite to the third cut allowing insertion of a pin through the aperture into the support surface aperture adjacent to the thick wall tubing to prevent the thick wall tubing from moving in a lateral direction and for preventing unintentional removal of the thick wall tubing from the support surface aperture.

5. The method of claim 3 comprising the step of cutting the third cut perpendicular to the first and second cuts.

6. The method of claim 1 wherein the method further comprises the step of forming an aperture in the bottom surface of the accessory directly in front of the thick wall tubing opposite to the third cut allowing insertion of a pin through the aperture into the support surface aperture adjacent to the thick wall tubing to prevent the thick wall tubing from moving in a lateral direction and for preventing unintentional removal of the thick wall tubing from the support surface aperture.

7. The method of claim 1 comprising the step of cutting the third cut perpendicular to the first and second cuts.

* * * * *